(12) United States Patent
Wu et al.

(10) Patent No.: US 8,274,271 B2
(45) Date of Patent: Sep. 25, 2012

(54) MOTHERBOARD WITH OVERCLOCKING AND OVERVOLTING FUNCTIONS

(75) Inventors: Chao-Chung Wu, Taipei (TW); Yu-Chen Lee, Taipei (TW); Chien-Shien Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 185 days.

(21) Appl. No.: 12/400,571

(22) Filed: Mar. 9, 2009

(65) Prior Publication Data
US 2009/0256546 A1  Oct. 15, 2009

(30) Foreign Application Priority Data

Apr. 14, 2008 (TW) .............................. 97113481 A

(51) Int. Cl.
*H02M 5/257* (2006.01)

(52) U.S. Cl. ......... 323/322; 323/283; 323/251; 713/310

(58) Field of Classification Search .................. 323/282, 323/283, 322, 351; 713/300, 310, 320
See application file for complete search history.

(56) References Cited

U.S. PATENT DOCUMENTS

| 7,359,811 | B1 * | 4/2008 | Liu ................................ 702/69 |
| 7,519,840 | B2 * | 4/2009 | Lim et al. ...................... 713/300 |
| 2006/0190748 | A1 | 8/2006 | Lim et al. |
| 2006/0285418 | A1 * | 12/2006 | Aoki .............................. 365/226 |
| 2008/0159000 | A1 * | 7/2008 | Li et al. .................... 365/185.23 |

FOREIGN PATENT DOCUMENTS

| TW | 200540645 | 12/2005 |
| TW | 200722955 | 6/2007 |

OTHER PUBLICATIONS

"Office Action of Taiwan Counterpart Application", issued on Aug. 24, 2011, p. 1-p. 7, in which the listed references were cited.

* cited by examiner

*Primary Examiner* — Nguyen Tran
(74) *Attorney, Agent, or Firm* — Jianq Chyun IP Office

(57) ABSTRACT

A motherboard with overclocking and overvolting functions is provided. The motherboard with an overvolting function includes a specified component, a voltage regulator and a micro-controller. The specified component receives an operating voltage. The voltage regulator generates the operating voltage according to a reference voltage. The micro-controller is electrically connected to an external input device for receiving a control signal issued by the external input device and adjusting the reference voltage according to the control signal.

8 Claims, 3 Drawing Sheets

MOTHERBOARD WITH OVERCLOCKING AND OVERVOLTING FUNCTIONS

FIELD OF THE INVENTION

The present invention relates to a motherboard, and more particularly to a motherboard with overclocking and overvolting functions. The present invention also relates to a computer system having such a motherboard.

BACKGROUND OF THE INVENTION

For enhancing the performance of a computer system, the user may change the BIOS (basic input output system) settings of the computer system. For example, through the BIOS settings, the operating voltage or the operating frequency to be used in a control chip or a central processing unit on a motherboard is adjustable. For example, overclocking is the process of forcing a computer component to run at a higher clock rate than it was designed or designated by the manufacturer; and a dynamic voltage scaling process to increase voltage is known as overvolting.

Take the overvolting process for example. There are several optional operating voltages (e.g. 1.50V, 1.55V, 1.60V, 1.65V, 1.70V) shown on the BIOS setup menu. Via the BIOS setup menu, the user may select an operating voltage of a specified component in order to operate such a specified component at its optimal performance.

FIG. 1 is a schematic functional block diagram illustrating an overvolting control device of a memory of a motherboard according to the prior art. As shown in FIG. 1, a central processing unit (CPU) 12, a north bridge chip 14, a south bridge chip 16, a memory 18, a voltage regulator 20 and a reference voltage control circuit 22 are mounted on the motherboard 10. Generally, the operating voltage Vmem of the memory 18 is generated by the voltage regulator 20 according to a reference voltage Vref. By outputting different voltage values of the reference voltage Vref from the reference voltage control circuit 22, the operating voltage Vmem of the memory 18 is adjustable.

Please refer to FIG. 1 again. The reference voltage control circuit 22 is electrically connected to two general purpose I/O ports (I/O-1 and I/O-2 ports). Via the BIOS setup menu, the voltage levels at the I/O-1 and I/O-2 ports are selected and thus a desired reference voltage Vref is obtained. For example, if the I/O-1 and I/O-2 ports can be in a ground status or a floating status, four different voltage levels of the reference voltage Vref can be obtained. Hereinafter, the possible situations of obtaining four different voltage levels of the reference voltage Vref will be illustrated as follows.

In a case that the I/O-1 and I/O-2 ports are both in the floating statuses, the reference voltage Vref is 1.5V (assuming that Vcc is 3V). That is, $$Vref = \frac{R1}{2R1} \times Vcc = 1.5V$$

In a case that the I/O-1 port is in the ground status but the I/O-2 port is in the floating status, the reference voltage Vref is obtained by the equation:

$$Vref = \frac{(R1 // R2)}{R1 + (R1 // R2)} \times Vcc$$

In a case that the I/O-1 port is in the floating status but the I/O-2 port is in the ground status, the reference voltage Vref is obtained by the equation:

$$Vref = \frac{(R1 // R3)}{R1 + (R1 // R3)} \times Vcc$$

In a case that the I/O-1 and I/O-2 ports are both in the ground statuses, the reference voltage Vref is 1.5V is obtained by the equation:

$$Vref = \frac{(R1 // R2 // R3)}{R1 + (R1 // R2 // R3)} \times Vcc$$

In other words, if the numbers of the general purpose I/O ports and corresponding resistors of the reference voltage control circuit 22 are increased, more diverse voltage levels of the reference voltage Vref are obtainable. For example, if three general purpose I/O ports are used, eight voltage levels of the reference voltage Vref are obtainable.

Generally, the components of the motherboard whose operating voltages can be adjusted via the BIOS setup menus include for example the central processing unit, the north bridge chip, the south bridge chip and the memory. Assuming that these four components can provide eight kinds of operating voltages, a total of twelve general purpose I/O ports are required (i.e. 3×4=12). For a purpose of providing more kinds of operating voltages through the BIOS settings, more I/O ports are required.

As for the overclocking process, a clock generator is mounted on the motherboard. The clock generator may provide various clock signals of different operating frequencies. The clock signals are transmitted to the central processing unit, the north bridge chip, the south bridge chip and the memory in order to coordinate the actions of these components. Similarly, through the general purpose I/O ports, the operating frequencies of the clock signals can be fine-tuned.

Moreover, the overvolting process and the overclocking process implemented via the BIOS setup menu are very troublesome and time-consuming. After the operating voltages and operating frequencies of all components are set via BIOS setup menu, the set values should be stored in the BIOS. Until the computer system is re-started, the set values are loaded into the BIOS to implement the overvolting and overclocking processes.

Nowadays, some motherboard manufacturers provide application programs to implement the overvolting process or the overclocking process. Since these application programs need to be executed under specified operation systems and the computer system needs to be re-started after the set values are determined, this approach is also inconvenient.

SUMMARY OF THE INVENTION

The present invention relates to a motherboard with overclocking and overvolting functions for adjusting the operating voltage or the clock signal's frequency of a specified component without the need of using BIOS setting. According to a control signal issued by an external input device, the operating voltage or the clock signal's frequency of the specified component is adjustable.

In an embodiment, the present invention provides a motherboard with an overvolting function. The motherboard includes a specified component, a voltage regulator and a micro-controller. The specified component receives an operating voltage. The voltage regulator generates the operating voltage according to a reference voltage. The micro-controller is electrically connected to an external input device for receiving a control signal issued by the external input device and adjusting the reference voltage according to the control signal.

In another embodiment, the present invention provides a motherboard with an overclocking function. The motherboard includes a specified component, a clock generator and a micro-controller. The specified component receives a clock signal. The clock generator generates the clock signal according to a counting value. The micro-controller is electrically connected to an external input device for receiving a control signal issued by the external input device and adjusting the counting value according to the control signal.

In another embodiment, the present invention provides a computer system. The computer system includes an input device and a motherboard. The input device generates a control signal. The motherboard includes a specified component, a voltage regulator and a micro-controller. The specified component receives an operating voltage. The voltage regulator generates the operating voltage according to a reference voltage. The micro-controller is electrically connected to the input device for receiving the control signal and adjusting the reference voltage according to the control signal.

In another embodiment, the present invention provides a computer system. The computer system includes an input device and a motherboard. The input device generates a control signal. The motherboard includes a specified component, a clock generator and a micro-controller. The specified component receives a clock signal. The clock generator generates the clock signal according to a counting value. The micro-controller is electrically connected to the input device for receiving the control signal and adjusting the counting value according to the control signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
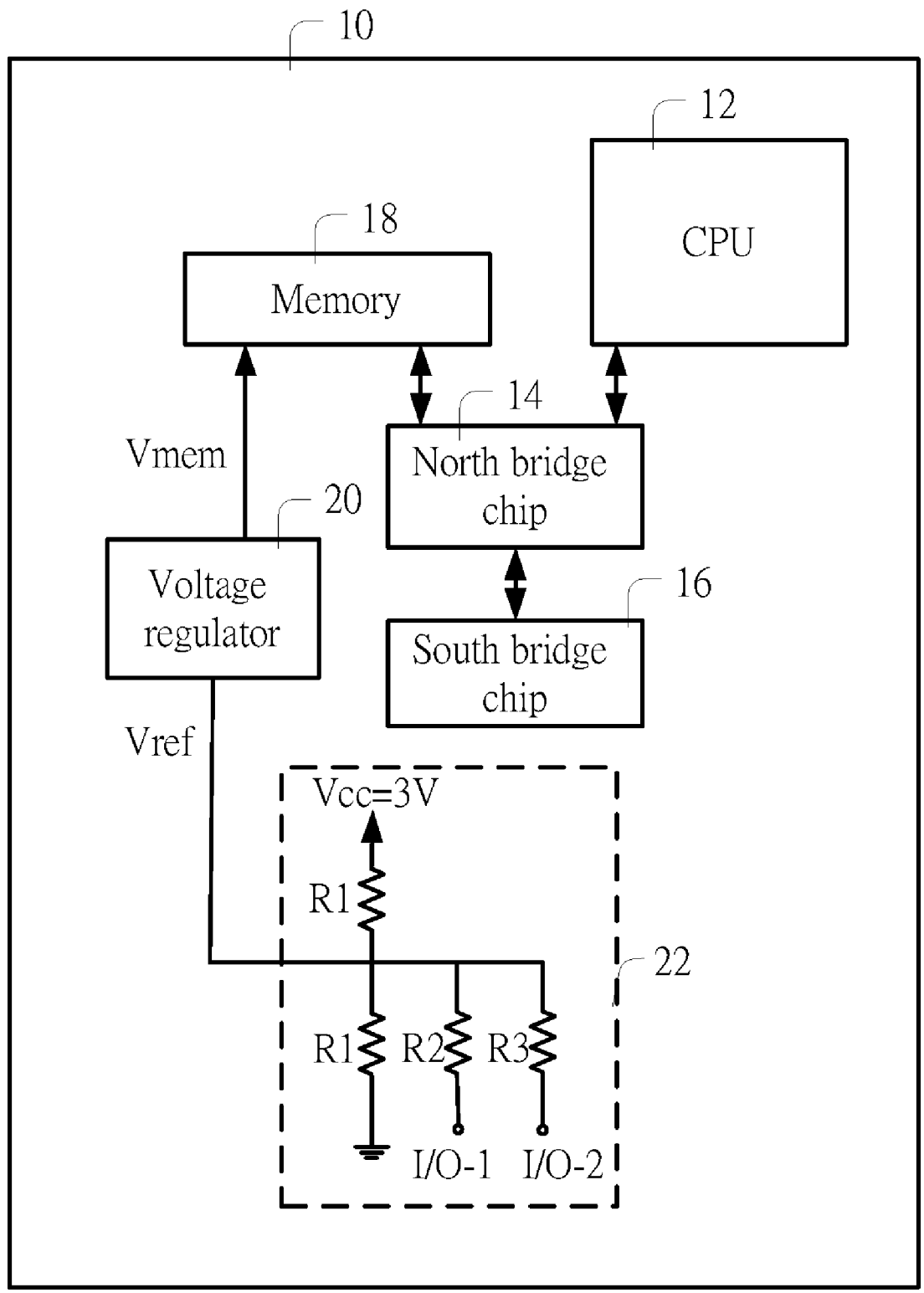
FIG. 1 is a schematic functional block diagram illustrating an overvolting control device of a memory of a motherboard according to the prior art.
Figure 2:
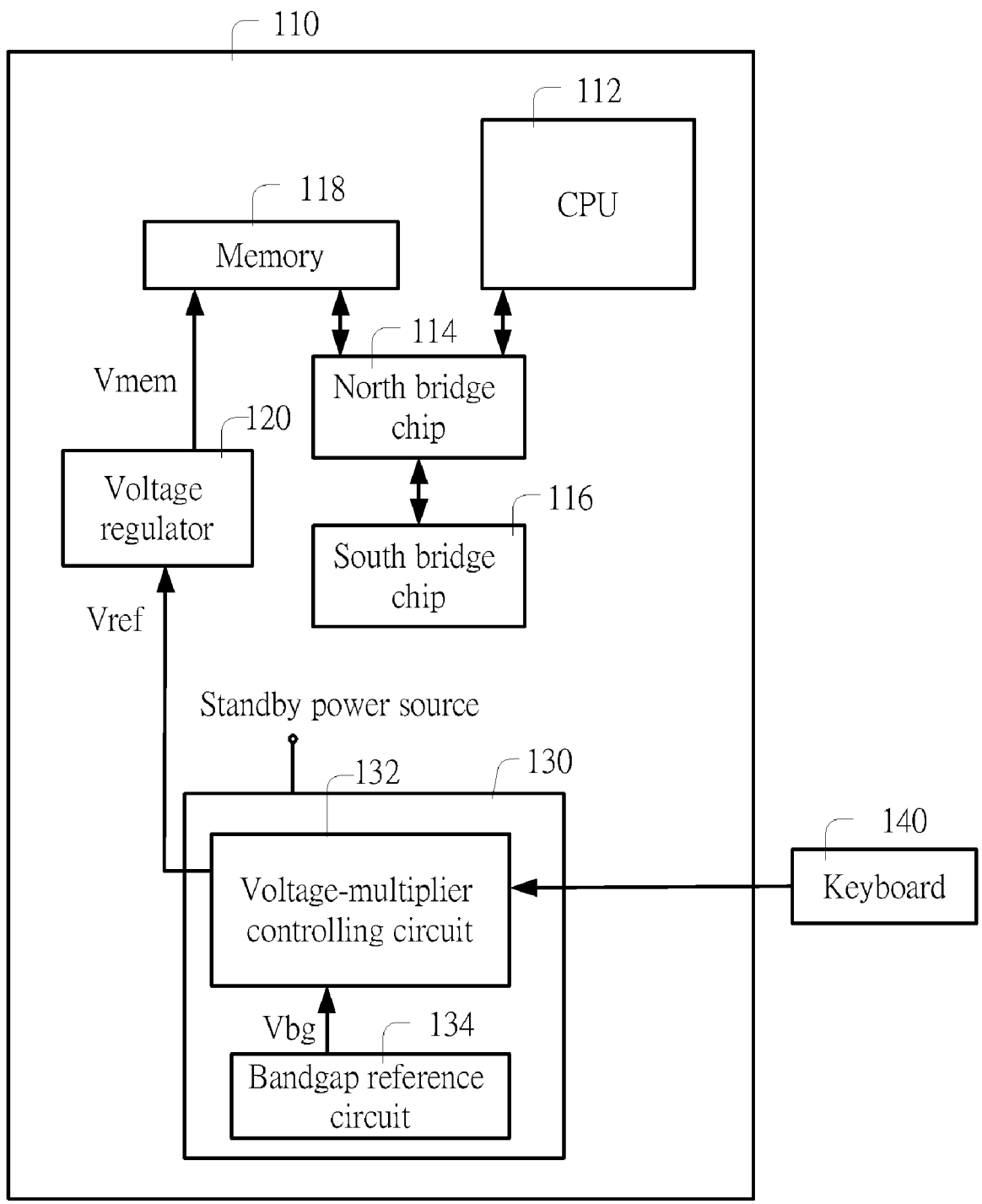
FIG. 2 is a schematic functional block diagram illustrating an overvolting control device of a memory of a motherboard according to a preferred embodiment of the present invention.

FIG. 2 is a schematic functional block diagram illustrating an overvolting control device of a memory of a motherboard according to a preferred embodiment of the present invention. As shown in FIG. 2, a central processing unit (CPU) 112, a north bridge chip 114, a south bridge chip 116, a memory 118, a voltage regulator 120 and a micro-controller 130 are mounted on the motherboard 110. The operating voltage Vmem of the memory 118 is generated by the voltage regulator 120 according to a reference voltage Vref.

In this embodiment, the micro-controller 130 is electrically connected to a standby power source. Consequently, the micro-controller 130 can perform the reference voltage control when the computer system is powered on, powered off or in a sleep mode. The micro-controller 130 comprises a bandgap reference circuit 134 and a voltage-multiplier controlling circuit 132. The bandgap reference circuit 134 is used to accurately generate a bandgap voltage (Vbg). The multiplier of the voltage-multiplier controlling circuit 132 is adjusted according to a hot-key instruction. An external input device such as a keyboard, a mouse, a joystick or a customization button is connected to the micro-controller 130 of the motherboard 110. In this embodiment, the input device is a keyboard 140. The user may input predefined hot-key instructions through the input device. In response to the hot-key instructions, corresponding control signals are transmitted to the micro-controller 130. In response to the control signals, the micro-controller 130 controls implementation of an overvolting process.

For example, according to the hot-key definitions, the process of adjusting the operating voltage Vmem of the memory 118 is activated when a composite key "Ctrl+1" is clicked; the operating voltage Vmem is increased when the key "+" is clicked; and the operating voltage Vmem is decreased when the key "−" is clicked. During the overvolting process, the user may click the composite key "Ctrl+1" to enable the channel of the operating voltage Vmem of the memory 118. After the channel of the operating voltage Vmem of the memory 118 is enabled, the user may click the key "+" to increase the reference voltage Vref and thus the operating voltage Vmem generated by the voltage regulator 120 is increased. Alternatively, after the channel of the operating voltage Vmem of the memory 118 is enabled, the user may click the key "−" to decrease the reference voltage Vref and thus the operating voltage Vmem generated by the voltage regulator 120 is decreased.

In other words, after the channel of the operating voltage Vmem of the memory 118 is enabled, the reference voltage Vref outputted from the voltage-multiplier controlling circuit 132 of the micro-controller 130 is increased by one level of the bandgap voltage (Vbg) when the key "+" is once clicked. On the other hand, the reference voltage Vref outputted from the voltage-multiplier controlling circuit 132 of the micro-controller 130 is decreased by one level of the bandgap voltage (Vbg) when the key "−" is once clicked. In an embodiment, the difference between every two levels of the bandgap voltage (Vbg) is 13 mV such that the reference voltage Vref outputted from the voltage-multiplier controlling circuit 132 is increased or decreased at the multipliers of 13 mV. As a consequence, the use of the micro-controller 130 can largely enhance the overvolting resolution.

In addition to adjustment of the operating voltage Vmem of the memory 118, the micro-controller 130 can control the operating voltages of all components on the motherboard 110. That is, the micro-controller 130 has a plurality of channels for outputting respective reference voltages. The operating voltages of different components can also be fine-tuned according to the respective reference voltages by the above-mentioned method. For example, according to the hot-key definitions, a first voltage channel (e.g. an operating voltage channel of the memory) is enabled when a composite key "Ctrl+1" is clicked; a second voltage channel (e.g. an operating voltage channel of the north bridge chip) is enabled when a composite key "Ctrl+2" is clicked; a third voltage channel (e.g. an operating voltage channel of the south bridge chip) is enabled when a composite key "Ctrl+3" is clicked; and a fourth voltage channel (e.g. an operating voltage channel of the CPU) is enabled when a composite key "Ctrl+4" is clicked. The rest may be deduced by analogy. After a specified voltage channel is enabled, the user may click the key "+" to increase the reference voltage or click the key "−" to decrease the reference voltage.

Figure 3:
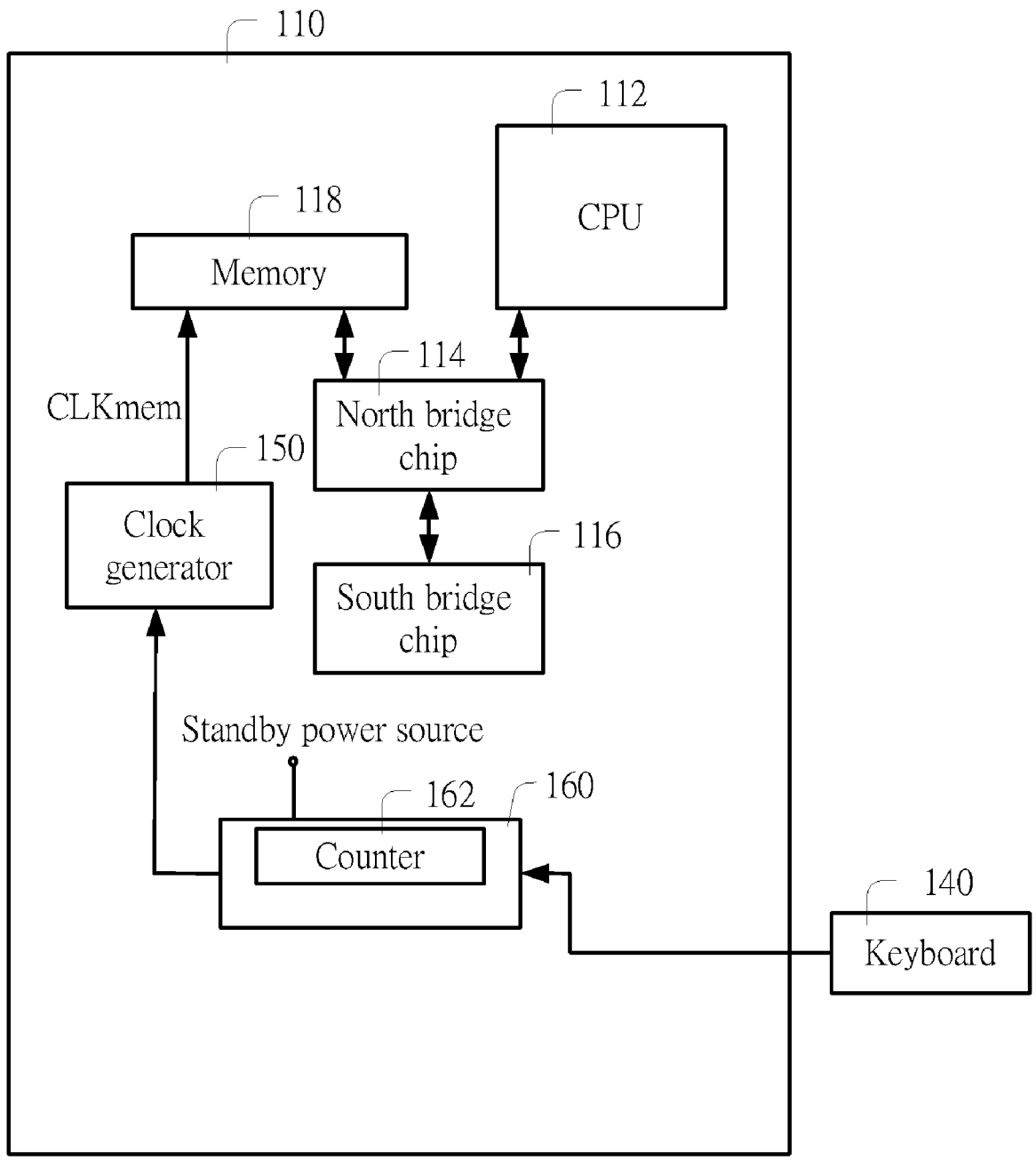
FIG. 3 is a schematic functional block diagram illustrating an overclocking control device of a memory of a motherboard according to a preferred embodiment of the present invention.

FIG. 3 is a schematic functional block diagram illustrating an overclocking control device of a memory of a motherboard according to a preferred embodiment of the present invention. As shown in FIG. 3, a central processing unit (CPU) 112, a north bridge chip 114, a south bridge chip 116, a memory 118, a clock generator 150 and a micro-controller 160 are mounted on the motherboard 110. The operating frequency of the clock signal CLKmem of the memory 118 is generated by the clock generator 150 according to a counting value. In this embodiment, the micro-controller 160 is connected with the clock generator 150 through a system management bus (SMbus).

In this embodiment, the micro-controller 160 is electrically connected to a standby power source. Consequently, the micro-controller 160 can control the operating frequency of the clock signal CLKmem when the computer system is powered on, powered off or in a sleep mode. The micro-controller 160 comprises a counter 162. An external input device such as a keyboard, a mouse, a joystick or a customization button is connected to the micro-controller 160 of the motherboard 110. In this embodiment, the input device is a keyboard 140. The user may input predefined hot-key instructions through the input device. In response to the hot-key instructions, corresponding control signals are transmitted to the micro-controller 160. In response to the control signals, the micro-controller 160 controls an overclocking process.

For example, according to the hot-key definitions, the process of adjusting the operating frequency of the clock signal CLKmem of the memory 118 is activated when a composite key "Ctrl+A" is clicked; the operating frequency of the clock signal CLKmem is increased when the key "+" is clicked; and the operating frequency of the clock signal CLKmem is decreased when the key "−" is clicked. During the overclocking process, the user may click the composite key "Ctrl+A" to enable the operating frequency channel of the clock signal CLKmem of the memory 118. After the operating frequency channel of the clock signal CLKmem of the memory 118 is enabled, the user may click the key "+" to increase the counting value and thus the operating frequency of the clock signal CLKmem generated by the clock generator 150 is increased. Alternatively, after the operating frequency channel of the clock signal CLKmem of the memory 118 is enabled, the user may click the key "−" to decrease the counting value and thus the operating frequency of the clock signal CLKmem generated by the clock generator 150 is decreased.

In other words, after the operating frequency channel of the clock signal CLKmem of the memory 118 is enabled, the counting value generated by the counter 162 of the micro-controller 160 is increased by 1 when the key "+" is once clicked. On the other hand, the counting value generated by the counter 162 of the micro-controller 160 is decreased by 1 when the key "−" is once clicked.

In addition to adjustment of the operating frequency of the clock signal CLKmem of the memory 118 of the memory 118, the micro-controller 160 can control the operating frequencies of the clock signals of all components on the motherboard 110. That is, the micro-controller 160 has a plurality of channels for outputting respective counting values. The operating frequencies of the clock signals of different components can also be fine-tuned according to the respective counting values by the above-mentioned method. For example, according to the hot-key definitions, a first operating frequency channel (e.g. an operating frequency channel of the memory) is enabled when a composite key "Ctrl+A" is clicked; a second operating frequency channel (e.g. an operating frequency channel of the north bridge chip) is enabled when a composite key "Ctrl+B" is clicked; and a third operating frequency channel (e.g. an operating frequency channel of the CPU) is enabled when a composite key "Ctrl+B" is clicked. The rest may be deduced by analogy. After a specified operating frequency channel is enabled, the user may click the key "+" to increase the operating frequency channel or click the key "−" to decrease the operating frequency channel.

In the above embodiments, the micro-controller for controlling the operating voltage and the micro-controller for controlling the operating frequency are separate components. Nevertheless, the micro-controller for controlling the operating voltage and the micro-controller for controlling the operating frequency can be combined as an integrated micro-controller. Since the micro-controller is electrically connected to a standby power source, the micro-controller can perform the reference voltage control when the computer system is powered on, powered off or in a sleep mode. In accordance of the present invention, a set of hot keys are defined through an external input device. The external input device includes for example a keyboard, a mouse, a joystick or a customization button. The hot keys are triggered to generate corresponding control signals. Since the operating voltage or the clock signal's frequency of the specified component is adjustable according to a control signal issued by an external input device, the present invention is more convenient in comparison with the prior art.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motherboard with an overvolting function, the motherboard comprising:
    a specified component receiving an operating voltage;
    a voltage regulator for generating the operating voltage according to a reference voltage; and
    a micro-controller, which is embedded on the motherboard and is directly connected to the voltage regulator, receiving a voltage increasing signal or a voltage decreasing signal from outside the motherboard and adjusting a voltage value of the reference voltage according to the voltage increasing signal or the voltage decreasing signal;
    an external input device, directly connected to the micro-controller, outputting the voltage increasing signal or the voltage decreasing signal to the micro-controller, wherein the micro-controller adjusts the voltage value of the reference voltage according to the voltage increasing signal or the voltage decreasing signal only when the motherboard is being turned on or being turned off or in a sleep mode;

a standby power source, directly connected to the micro-controller, providing power to the motherboard when the motherboard is being turned on or being turned off or in the sleep mode.

2. The motherboard with an overvolting function according to claim 1 wherein the specified component is a central processing unit, a north bridge chip, a south bridge chip or a memory.

3. The motherboard with an overvolting function according to claim 1 wherein the micro-controller comprises:
   a bandgap reference circuit for providing a bandgap voltage; and
   a voltage-multiplier controlling circuit for adjusting the bandgap voltage according to the control signal, thereby generating the reference voltage.

4. The motherboard with an overvolting function according to claim 1 wherein the external input device is a keyboard, a mouse or a joystick.

5. A computer system comprising:
   an external input device for generating a voltage increasing signal or a voltage decreasing signal; and
   a motherboard comprising a specified component, a voltage regulator and a micro-controller, wherein the specified component receives an operating voltage, the voltage regulator generates the operating voltage according to a reference voltage, and the micro-controller, which is embedded on the motherboard and is directly connected to the voltage regulator, is connected to a standby power source, and is electrically connected to the external input device, receiving the voltage increasing signal or the voltage decreasing signal and adjusting a voltage value of the reference voltage using power provided by the standby power source according to the voltage increasing signal or the voltage decreasing signal only when the motherboard is being turned on or being turned off or in a sleep mode.

6. The computer system according to claim 5 wherein a set of hot keys are defined through the input device, and one of the hot keys is triggered to generate a corresponding control signal.

7. The computer system according to claim 5 wherein the specified component is a central processing unit, a north bridge chip, a south bridge chip or a memory.

8. The computer system according to claim 5 wherein the micro-controller comprises:
   a bandgap reference circuit for providing a bandgap voltage; and
   a voltage-multiplier controlling circuit for adjusting the bandgap voltage according to the control signal, thereby generating the reference voltage.

* * * * *